(12) United States Patent
Mizoguchi et al.

(10) Patent No.: US 11,162,908 B2
(45) Date of Patent: Nov. 2, 2021

(54) QUALITY INSPECTION METHOD

(71) Applicant: Konica Minolta, Inc., Tokyo (JP)

(72) Inventors: Keisuke Mizoguchi, Hachioji (JP); Mitsuharu Kitamura, Tokyo (JP); Kenji Goto, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 3 days.

(21) Appl. No.: 16/500,120

(22) PCT Filed: Mar. 30, 2018

(86) PCT No.: PCT/JP2018/013661
§ 371 (c)(1),
(2) Date: Oct. 2, 2019

(87) PCT Pub. No.: WO2018/186296
PCT Pub. Date: Oct. 11, 2018

(65) Prior Publication Data
US 2021/0109038 A1    Apr. 15, 2021

(30) Foreign Application Priority Data

Apr. 7, 2017    (JP) .............................. JP2017-076623

(51) Int. Cl.
*G01N 23/041* (2018.01)
*G01N 23/083* (2018.01)

(52) U.S. Cl.
CPC ......... *G01N 23/041* (2018.02); *G01N 23/083* (2013.01); *G01N 2223/04* (2013.01);
(Continued)

(58) Field of Classification Search
None
See application file for complete search history.

(56) References Cited

U.S. PATENT DOCUMENTS

2013/0011040 A1    1/2013    Kido et al.
2019/0310208 A1*  10/2019    Sharma ................ G01N 23/201

FOREIGN PATENT DOCUMENTS

JP    2971432    9/1999

OTHER PUBLICATIONS

International Preliminary Report on Patentability in parent PCT/JP2018/013661, dated Oct. 8, 2019.
(Continued)

*Primary Examiner* — Hoon K Song
(74) *Attorney, Agent, or Firm* — BakerHostetler

(57) ABSTRACT

Provided is a quality inspection method in which an inner state of a three-dimensional laminated molding can be quickly and easily inspected without destroying the three-dimensional laminated molding. To this end, the quality inspection method uses an X-ray Talbot imaging system 1 which creates a reconstructed image of an inspection object on the basis of a moire image obtained by using an X-ray detector to read X-rays which, after being radiated from an X-ray source 11a, have passed through: a plurality of grids in which a plurality of slits S are arranged in a direction perpendicular to the radiation axis direction of the X-ray; and an inspection object H placed on a subject table 13. The inspection object H is a three-dimensional laminated molding formed into a three-dimensional shape by laminating multiple layers of constituent materials. The reconstructed image is created while the inspection object H is placed on the subject table 13 in such a way that at least the lamination direction of layers constituting the inspection object H and the arrangement direction of the plurality of slits S in the plurality of grids are parallel. The inner state of the inspection object H is inspected on the basis of the reconstructed image.

5 Claims, 9 Drawing Sheets

(52) U.S. Cl.
CPC .  *G01N 2223/401* (2013.01); *G01N 2223/615* (2013.01); *G01N 2223/645* (2013.01)

(56) References Cited

OTHER PUBLICATIONS

International Search Report issued in parent PCT/JP2018/013661, dated May 15, 2018.
European Patent Application No. 18781114.6; Extended Search Report; dated Mar. 17, 2020; 8 pages.
Malecki et al.; "X-ray tensor tomography"; EPL—Europhysics Letters; vol. 105; Feb. 2014; 18 pages.
Japan Patent Application No. 2019-511201; Notice of Reasons for Refusal; dated Mar. 30, 2021; 6 pages.
Bayer et al.; "Projection angle dependence in grating-based X-ray dark-field imaging or ordered structures"; Optic Express; vol. 21 No. 17; Aug. 2013; p. 19922-19933.
China Patent Application No. 201880021838.5; Office Action; dated Jul. 30, 2021; 17 pages.

* cited by examiner

FIG. 10E
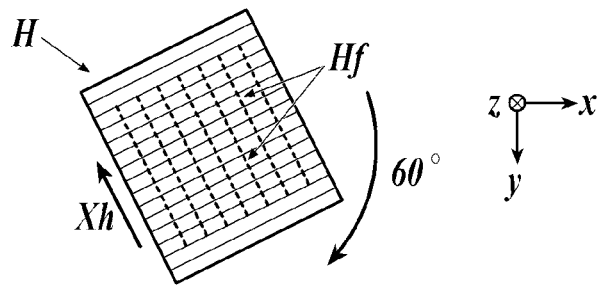
FIG. 10F
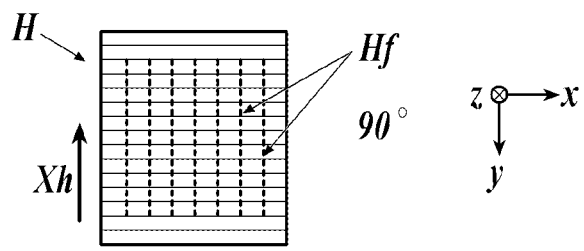
FIG. 11
| GRID ANGLE | SMALL-ANGLE SCATTERING SIGNAL VALUE |
|---|---|
| 0° (VERTICAL) | 0.15 |
| 30° | 0.25 |
| 45° | 0.30 |
| 60° | 0.36 |
| 90° (PARALLEL) | 0.42 |

QUALITY INSPECTION METHOD

The present U.S. Patent Application is U.S. National Phase Application under 35 U.S.C. 371 of International Application No. PCT/JP2018/013661 filed on Mar. 30, 2018, which claims priority under the Paris Convention to Japanese Patent Application No. 2017-076623 filed on Apr. 7, 2017, the entire disclosure of which is incorporated herein by reference.

TECHNICAL FIELD

The present invention relates to a quality inspection method.

BACKGROUND ART

Conventionally non-destructive inspection methods are known in which an inspection object having a three-dimensional shape is inspected for the existence and state of a defect therein, the property and state thereof, the internal structure thereof, or the like without disassembling nor destroying the inspection object.

One of such known non-destructive inspection methods is a non-destructive inspection method using an X-ray imaging system, in which method an inspection object is radiated with an X-ray; the resultant transmitted X-ray distribution is converted into a digital value to obtain digital image data; and the digital image data is subject to image processing, thereby performing inspection of the inside of the inspection object in a non-destructive manner.

For example, No. 2971432 discloses an inspection value method using X-ray, in which an X-ray is transmitted through a fiber reinforcement plastic structural body to acquire a transmission image of the fiber reinforcement plastic structural body, and on the basis of the transmission image the orientation state of reinforcement fiber is inspected.

In particular, among inspection objects having three-dimensional shapes, a three-dimensional laminated shaped product formed into a three-dimensional shape by laminating multiple layers of constituent material may have experienced entrainment of minute air bubbles and occurrence of gaps between the laminated layers during lamination, and thus the internal structure and the like highly need to be sufficiently inspected to maintain the quality of the shaped product.

CITATION LIST

Patent Literature

Patent Literature 1: JP2971432

SUMMARY OF INVENTION

Technical Problem

However, anomalies such as entrainment of minute air bubbles and generation of gaps between laminated layers of constituent material, which occur when a three-dimensional laminated shaped product is formed, occur in an extremely fine manner, and thus have been difficult to be checked by a conventional non-destructive inspection method disclosed in, for example, Patent Literature 1.

Thus, quality inspection of a three-dimensional laminated shaped product can be only performed by a method of destructive inspection that involves destruction of an inspection object. In the destructive inspection, quality inspection cannot be performed for a large area and thus needs significantly amounts of work and time.

Furthermore, in the destructive inspection, not the entire product but only part thereof can be inspected, and thus sufficient quality management cannot be performed for the three-dimensional laminated shaped product.

The present invention is made in view of the above circumstance and provide a quality inspection method capable of quickly and easily inspecting the inner state of a three-dimensional laminated shaped product without destroying the three-dimensional laminated shaped product.

To solve the above-described problem, the quality inspection method according to claim 1 is a quality inspection method using an X-ray Talbot imaging system in which: an X-ray source configured to radiate an X-ray; a plurality of grids in each of which a plurality of slits are arranged in a direction orthogonal to a radiation axis direction of the X-ray; a subject table on which an inspection object is placed; and an X-ray detector are disposed side by side in the radiation axis direction, and that generates a reconstructed image of the inspection object, on the basis of a moire image obtained by reading, at the X-ray detector, the X-ray radiated from the X-ray source and having passed through the plurality of grids and the inspection object placed on the subject table, in which the inspection object is a three-dimensional laminated shaped product formed into a three-dimensional shape by laminating multiple layers of constituent material, and the X-ray Talbot imaging system generates the reconstructed image while the inspection object is placed on the subject table so that at least a direction in which the layers of the inspection object are laminated and a direction in which the plurality of slits of the plurality of grids are arranged are parallel to each other, and an inner state of the inspection object is inspected on the basis of the reconstructed image.

The invention according to claim 2 is the quality inspection method according to claim 1, in which the X-ray source radiates an X-ray to which the inspection object is exposed at an average energy of 15 keV to 50 keV.

The invention according to claim 3 is the quality inspection method according to claim 1 or 2, in which The X-ray Talbot imaging system acquires, for each of a case in which the inspection object is placed on the subject table and a case in which the inspection object is not placed on the subject table, a plurality of moire images by repeating processing of moving at least one of the plurality of grids in a direction orthogonal to a radiation direction of the X-ray and reading an image signal by the X-ray detector in accordance with the X-ray radiated by the X-ray source each time the slits of the grid move by a constant periodic interval, produces a reconstructed image of the inspection object on the basis of the plurality of moire images with the inspection object and the plurality of moire images without the inspection object, and provides the reconstructed image of the inspection object with correction of an artifact attributable to an imaging condition difference between the case in which the moire images with the inspection object are captured and the case in which the moire images without the inspection object are captured.

The invention according to claim 4 is the quality inspection method according to any one of claims 1 to 3, in which the inspection object is formed of the constituent material that is composite resin containing fiber material, and X-ray imaging is performed a plurality of times while the inspection object is rotated about a radiation axis of the X-ray so that the orientation of the inspection object changes relative to the direction in which the slits are arranged.

According to the present invention, the inner state of a three-dimensional laminated shaped product can be quickly and easily inspected without destroying the three-dimensional laminated shaped product.

BRIEF DESCRIPTION OF DRAWINGS

FIG. 10E is a plan view of the inspection object placed on the subject table when viewed in the X-ray radiation direction.

FIG. 10F is a plan view of the inspection object placed on the subject table when viewed in the X-ray radiation direction.

FIG. 11 is a table indicating the correspondence relation between the orientation of the inspection object and a small-angle scattering signal value.

DESCRIPTION OF EMBODIMENT

First Embodiment

The following describes a first embodiment of the present invention with reference to the accompanying drawings.

Although embodiments described below includes various kinds of limitations technologically preferable for performing the present invention, the technical scope of the present invention is not limited to the embodiments below and exemplary illustrations.

A quality inspection method in the present embodiment is a non-destructive inspection method that inspects the inner state of an inspection object H as a subject having a three-dimensional shape without disassembling nor destroying the inspection object H by using an X-ray Talbot imaging system 1 (refer to FIG. 1) capable of performing X-ray Talbot imaging.

As described later, in the present embodiment, the X-ray Talbot imaging system 1 that uses a Talbot-Lau interferometer including a radiation source grid 12 (also referred to as, for example, multigrid, multislit, and G0 grid) is employed. Alternatively, an X-ray Talbot imaging system that uses a Talbot interferometer not including the radiation source grid 12 but including only a first grid 14 (also referred to as G1 grid) and a second grid 15 (also referred to as G2 grid) may be employed.

[X-Ray Talbot Imaging System]

In the X-ray Talbot imaging system 1, an X-ray source configured to radiate an X-ray, a plurality of grids in each of which a plurality of slits are arranged in a direction orthogonal to the radiation axis direction of the X-ray radiated from the X-ray source, a subject table on which the inspection object H is placed, and an X-ray detector are disposed side by side in the radiation axis direction of the X-ray. The X-ray Talbot imaging system 1 generates a reconstructed image of the inspection object H on the basis of a moire image obtained by reading, at the X-ray detector, the X-ray radiated from the X-ray source and having passed through the plurality of grids and the inspection object H placed on the subject table.

Figure 1:
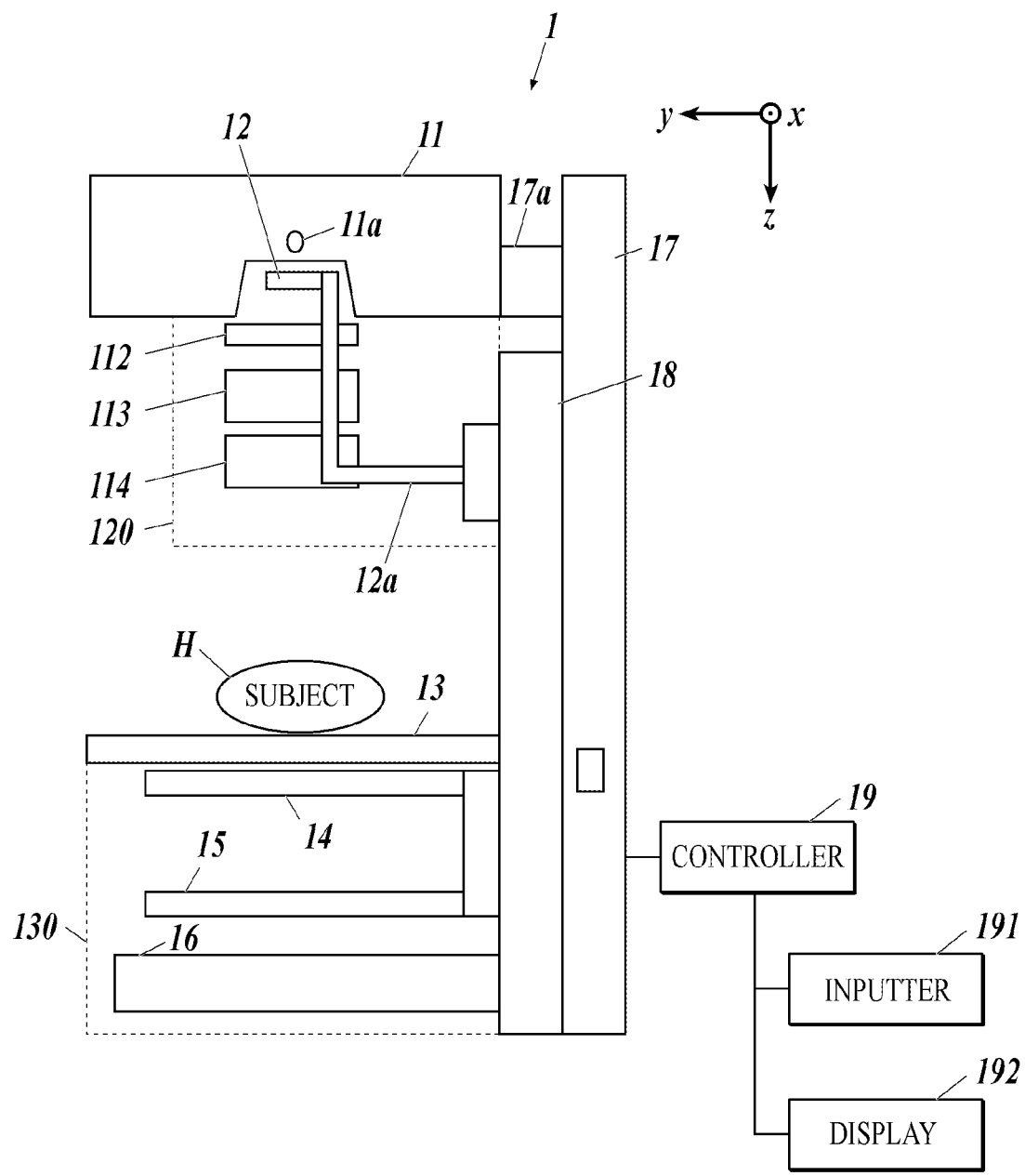
FIG. 1 is a schematic diagram illustrating the entire appearance of an X-ray Talbot imaging system.

FIG. 1 is a schematic diagram illustrating the entire appearance of the X-ray Talbot imaging system 1 according to the present embodiment.

As illustrated in FIG. 1, the X-ray Talbot imaging system 1 according to the present embodiment includes, for example, an X-ray generation device 11, the radiation source grid 12, a subject table 13, the first grid 14, the second grid 15, an X-ray detector 16, a support 17, a base 18, and a controller 19.

According to such an X-ray Talbot imaging system 1, at least three kinds of images can be reconstructed by capturing a moire image of the inspection object H having a three-dimensional shape and placed on the subject table 13 by a method on the basis of the principle of a fringe scanning method and by analyzing the moire image by a Fourier transform method. Specifically, the three kinds of images (these images are referred to as "reconstructed images") are an absorption image (same as a normal X-ray absorption image) obtained by visualizing the average component of moire fringes in the moire image, a differential phase image obtained by visualizing phase information of moire fringes, and a small-angle scattering image obtained by visualizing visibility (clarity) of moire fringes. A larger number of kinds of images can be generated by, for example, resynthesizing these three kinds of reconstructed images.

<Principle of Talbot Imaging>

Figure 2:
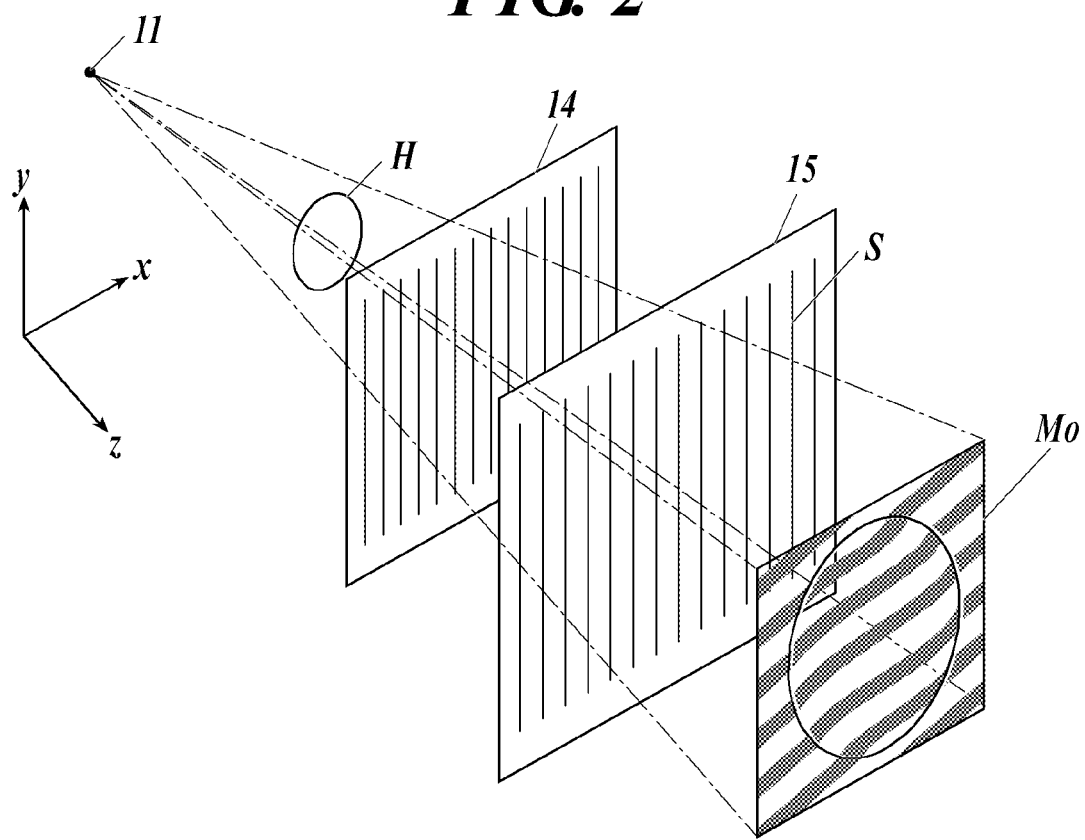
FIG. 2 is a diagram for description of the principle of a Talbot interferometer.

The following first describes a principle common to a Talbot interferometer and a Talbot-Lau interferometer with reference to, for example, FIG. 2.

Figure 3:
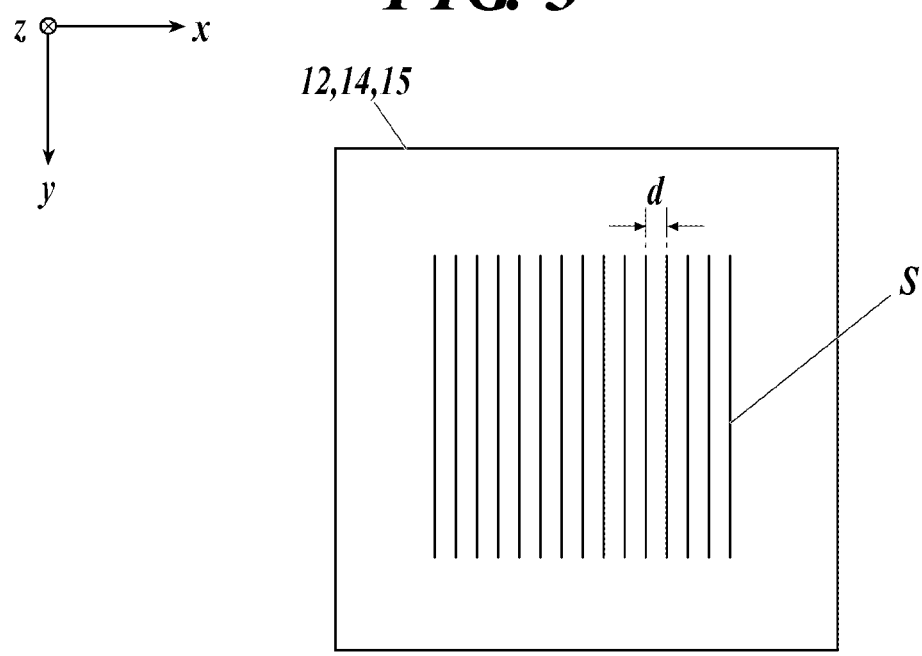
FIG. 3 is a schematic plan view of a radiation source grid, a first grid, and a second grid.

FIG. 2 is a diagram for description of the principle of a Talbot interferometer. FIG. 3 is a schematic plan view of grids in the present embodiment. The configuration illustrated in FIG. 3 is common to a plurality of grids in the present embodiment (which are the radiation source grid, the first grid, and the second grid to be described later).

Although FIG. 2 illustrates the case of a Talbot interferometer, basically same description applies to the case of a Talbot-Lau interferometer.

The z direction in FIG. 2 corresponds to the vertical direction in the X-ray Talbot imaging system 1 in FIG. 1, and the x and y directions in FIG. 2 correspond to the horizontal direction (the front-back direction and the left-right direction) in the X-ray Talbot imaging system 1 in FIG. 1.

As illustrated in FIG. 3, in the first grid 14 and the second grid 15 (and the radiation source grid 12 in the case of a Talbot-Lau interferometer), a plurality of slits S extending in the y direction orthogonal to the z direction as the radiation direction of an X-ray are arranged in the x direction at a predetermined period d.

As illustrated in FIG. 2, when an X-ray radiated from an X-ray source 2 (in the case of a Talbot-Lau interferometer, X-rays as multiple light sources into which an X-ray radiated from the X-ray source 2 is formed through the radiation source grid 12 (not illustrated in FIG. 2)) passes through the first grid 14, each X-ray having passed through the grid forms an image at a constant interval in the z direction. This image is referred to as a self image (also referred to as grid image or the like), and this phenomenon that the self images are formed at a constant interval in the z direction is called the Talbot effect.

In other words, the Talbot effect refers to a phenomenon that, as coherent light passes through the first grid 14 in which the slits S are provided at the constant period d as illustrated in FIG. 3, self images thereof are formed at a constant interval in the traveling direction of the light as described above.

As illustrated in FIG. 2, the second grid 15 in which the slits S are provided similarly to the first grid 14 is disposed at a position at which each self image of the first grid 14 is formed. A moire image Mo is formed on the second grid 15 when the second grid 15 is disposed so that the arrangement direction (which is the x axial direction in FIG. 2) of the slits S of the second grid 15 is substantially parallel to the arrangement direction of the slits S of the first grid 14.

In FIG. 2, the moire image Mo is separated from the second grid 15 because mixture of the moire fringes and the slits S hinders understanding when the moire image Mo is illustrated on the second grid 15. However, in reality, the moire image Mo is formed on the second grid 15 and downstream thereof. Then, the moire image Mo is captured by the X-ray detector 16 disposed directly below the second grid 15.

When the subject H exists between the X-ray source 2 and the first grid 14 (in other words, on the subject table 13 in FIG. 1) as illustrated in FIG. 2, the phase of an X-ray is shifted by the subject H, and thus moire fringes in the moire image Mo are disturbed beyond the periphery of the subject. When the subject H does not exist between the X-ray source 2 and the first grid 14 although not illustrated, the moire image Mo including only undisturbed moire fringes appears. This is the principle of a Talbot interferometer and a Talbot-Lau interferometer.

In the X-ray Talbot imaging system 1 according to the present embodiment, as illustrated in, for example, FIG. 1, the second grid 15 is disposed at the position at which each self image of the first grid 14 is formed in a second cover 130 on the basis of the principle. As described above, the moire image Mo (refer to FIG. 2) becomes blurred as the distance between the second grid 15 and the X-ray detector 16 increases, and thus in the present embodiment, the X-ray detector 16 is disposed directly below the second grid 15.

The second cover 130 is provided to protect the X-ray detector 16 and the like by preventing a person or an object from hitting or touching the first grid 14, the second grid 15, the X-ray detector 16, and the like.

Although not illustrated, the X-ray detector 16 includes conversion elements disposed in a two-dimensional shape (matrix) and each configured to generate an electric signal in accordance with a radiated X-ray, and reads, as an image signal, the electric signal generated by each conversion element. In the present embodiment, the X-ray detector 16 captures, as the image signal of each conversion element, the above-described moire image Mo as an X-ray image formed on the second grid 15.

In the present embodiment, the X-ray Talbot imaging system 1 captures a plurality of moire images Mo by what is called the fringe scanning method.

The fringe scanning method is an imaging method in X-ray Talbot imaging in which: for each of a case in which the inspection object H is placed on the subject table 13 and a case in which the inspection object H is not placed on the subject table 13, a plurality of moire images Mo are acquired by repeating processing of moving at least one of the plurality of grids 12, 14, and 15 in a direction orthogonal to the X-ray radiation direction and reading an image signal by the X-ray detector 16 in accordance with an X-ray radiated by the X-ray generation device 11 (an X-ray source 11a of the X-ray generation device 11) each time the slits S of the grid move by a constant periodic interval; a reconstructed image of the inspection object H is produced on the basis of the plurality of moire images Mo captured while the inspection object H is placed and the plurality of moire images Mo captured while the inspection object H is not placed; and the reconstructed image of the inspection object H is provided with correction of an artifact attributable to an imaging condition difference between the case in which the moire images Mo with the inspection object H are captured and the case in which the moire images Mo without the inspection object H are captured.

In the X-ray Talbot imaging system 1 according to the present embodiment, a plurality of moire images Mo are captured while the relative positions of the first grid 14 and the second grid 15 are shifted in they axial direction in FIGS. 1 to 3 (which is a direction orthogonal to the arrangement direction of the slits S (the x axial direction)).

Then, image signals of the plurality of captured moire images Mo are provided with image processing at an image processing device (not illustrated), and for example, an absorption image, a differential phase image, or a small-angle scattering image (reconstructed image of the inspection object H) is reconstructed on the basis of the plurality of moire images Mo and provided with artifact correction.

In this manner, in the X-ray Talbot imaging system 1 according to the present embodiment, for example, a movement device (not illustrated) for each movement of the first grid 14 in the y axial direction by a predetermined amount is provided to capture a plurality of moire images Mo by the fringe scanning method. The second grid 15 may be moved in place of the first grid 14, or the first grid 14 and the second grid 15 may be both moved.

In the X-ray Talbot imaging system 1, a single moire image Mo may be captured while the relative positions of the first grid 14 and the second grid 15 are fixed, and for example, an absorption image, a differential phase image, or a small-angle scattering image (reconstructed image of the inspection object H) may be reconstructed by, for example, analyzing the moire image Mo by the Fourier transform method or the like in the image processing at the image processing device.

When this method is employed, the X-ray Talbot imaging system 1 does not necessarily need to be provided with the above-described movement device or the like, and the present invention is also applicable to an X-ray Talbot imaging device not provided with such a movement device.

<Device Configuration of X-Ray Talbot Imaging System>

The following describes a specific configuration of each component of the X-ray Talbot imaging system 1 according to the present embodiment.

The X-ray Talbot imaging system 1 in the present embodiment has what is called an upright device configuration in which the z axial direction illustrated in FIG. 1 is aligned with the vertical direction, and the X-ray generation device 11, the radiation source grid 12, the subject table 13, the first grid 14, the second grid 15, and the X-ray detector 16 are disposed in the stated order in the z direction aligned with the vertical direction. Accordingly, in the present embodiment, the radiation direction of an X-ray from the X-ray generation device 11 is along the z direction.

The X-ray generation device 11, the radiation source grid 12, the subject table 13, the first grid 14, the second grid 15, and the X-ray detector 16 are supported by the support 17.

In the present embodiment, a buffer member 17*a* is provided between the X-ray generation device 11 and the support 17 to prevent vibration of the X-ray generation device 11 from propagating to another part of the X-ray Talbot imaging system 1, such as the support 17 (or to reduce the propagating vibration), and the X-ray generation device 11 is supported by the support 17 through the buffer member 17*a*.

The X-ray generation device 11 includes, as the X-ray source 11*a*, a Coolidge X-ray source, a rotating anode X-ray source, or the like, which are widely and typically used in, for example, clinical practice. The X-ray source 11*a* is not limited to those exemplarily listed above, but may be another X-ray source.

The X-ray generation device 11 according to the present embodiment radiates an X-ray in a cone beam shape from a focal point. Accordingly, the radiated X-ray spreads as the X-ray is farther separated from the X-ray generation device 11.

In the present embodiment, the radiation source grid 12 is provided below the X-ray generation device 11.

In the present embodiment, to prevent vibration of the X-ray generation device 11 caused by, for example, rotation of the anode of the X-ray source 11*a* from propagating to the radiation source grid 12, the radiation source grid 12 is not attached to the X-ray generation device 11 but is attached to a fixing member 12*a* attached to the base 18 provided to the support 17.

In the present embodiment, in addition to the radiation source grid 12, for example, a filtration filter 112 (also referred to as an added filter) for changing the radiation quality of an X-ray having passed through the radiation source grid 12, a radiation field aperture 113 for narrowing the radiation field of an X-ray to be radiated, and a radiation field lamp 114 for performing positioning by radiating the subject with visible light in place of an X-ray before X-ray radiation are attached to the fixing member 12*a* described above.

The radiation source grid 12, the filtration filter 112, and the radiation field aperture 113 do not necessarily need to be provided in the stated order. In the present embodiment, a first cover 120 for protecting a component such as the radiation source grid 12 is disposed around the component.

In the present embodiment, the controller 19 (refer to FIG. 1) is achieved by a computer in which a central processing unit (CPU) (not illustrated), a read only memory (ROM), a random access memory (RAM), an input-output interface, and the like are connected with a bus.

The controller 19 may be a dedicated control device instead of a general-purpose computer as in the present embodiment.

The controller 19 includes, for example, an inputter 191 including an operation unit, and a display 192.

In addition, the controller 19 is provided with various means such as an outputter including a printer or the like, a storage, and a communicator, and devices as appropriate.

The controller 19 performs overall control related to the X-ray Talbot imaging system 1.

Specifically, for example, the controller 19 is connected with the X-ray generation device 11 and can set pipe voltage, pipe current, radiation time, and the like to the X-ray source 11*a*.

In the present embodiment, the controller 19 controls the X-ray generation device 11 so that the X-ray source 11*a* radiates an X-ray to which the inspection object H is exposed at an average energy of 15 keV to 50 keV.

In this manner, when the inspection object H is exposed to an X-ray that has relatively low energy and to which the inspection object H is exposed at an average energy equal to or higher than 15 keV and lower than 50 keV, sufficient contrast is obtained between a void space part such as an air bubble Fa (refer to FIG. 6B) or a gap Fd (refer to FIGS. 9B and 9C) inside the inspection object H according to the present embodiment as a three-dimensional laminated shaped product and the other part, and thus it is possible to visualize the existence of extremely minute anomalous parts such as the air bubble Fa and the gap Fd that are minute inside the inspection object H.

The display 192 of the controller 19 is achieved by a monitor such as a liquid crystal display (LCD) or a cathode ray tube (CRT), and displays an input instruction input from the inputter 191 such as the operation unit, data, and the like in accordance with an instruction in a display signal input from the CPU.

In the present embodiment, a reconstructed image (such as an absorption image, a differential phase image, or a small-angle scattering image) of the inspection object H is generated on the basis of the moire image Mo as described above, and can be displayed on the display 192.

When the X-ray Talbot imaging system 1 captures a plurality of moire images Mo by the fringe scanning method as in the present embodiment, the controller 19 controls the above-described movement device to perform processing such as adjustment of a predetermined amount by which the first grid 14 (or the second grid 15, or both) is moved and timing adjustment between grid movement and X-ray radiation from the X-ray generation device 11.

For example, the controller 19 may relay signal and data transmission and reception between the X-ray detector 16 and, for example, an external image processing device (not illustrated).

A generator dedicated to the X-ray generation device 11 may be used as a controller that controls the X-ray generation device 11, and the controller 19 for, for example, controlling the movement device that moves the grid may be provided as a device separated from the generator of the X-ray generation device 11. The configuration of the controller 19 may be determined as appropriate.

The storage and the ROM described above store various kinds of data necessary for performing, for example, setting of the pipe voltage, pipe current, radiation time, and the like of the X-ray source 11a of the X-ray generation device 11 and timing adjustment between grid movement and X-ray radiation from the X-ray generation device 11, and store processing programs necessary for performing various kinds of processing.

[Three-Dimensional Laminated Shaped Product]

Figure 4A:
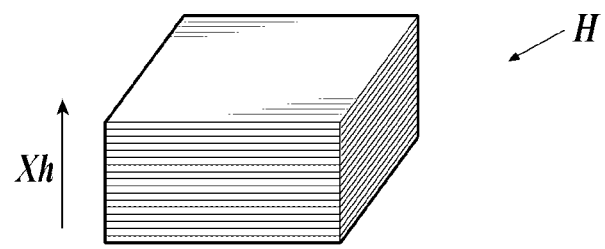
FIG. 4A is a perspective view illustrating the appearance of an inspection object.
Figure 4B:
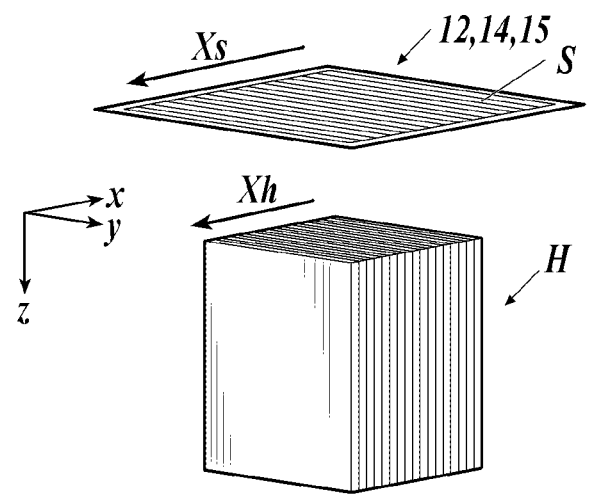
FIG. 4B is an explanatory diagram illustrating the relation between a lamination direction of the inspection object and a slit arrangement direction of each grid.

FIG. 4A is a perspective view illustrating the appearance of the inspection object H in the present embodiment, and FIG. 4B is an explanatory diagram illustrating the relation between the lamination direction of the inspection object H and the slit arrangement direction of each grid.

As illustrated in FIG. 4A, the inspection object H according to the present embodiment is a three-dimensional laminated shaped product formed into a three-dimensional shape by laminating multiple layers of constituent material cc. In FIGS. 4A and 4B, the lamination direction of the inspection object H is denoted by Xh.

The inspection object H illustrated in FIGS. 4A and 4B is simplified for clear description of the structure thereof, and it is assumed that the actual structure and shape of the inspection object H are more complicated.

In the present embodiment, a reconstructed image is generated by performing imaging while the inspection object H is placed on the subject table 13 so that at least the lamination direction Xh of the layers of the inspection object H and the arrangement direction (denoted by Xs in FIG. 4B) of the plurality of slits S of the plurality of grids (in the present embodiment, the radiation source grid 12, the first grid 14, the second grid 15) are parallel to each other, and the inner state of the inspection object H is inspected on the basis of the reconstructed image.

Specifically, as illustrated in FIG. 4B, the inspection object H is placed on the subject table 13 with orientations aligned so that the arrangement direction Xs of the plurality of slits S and the lamination direction Xh are parallel to each other, and imaging is performed in this state.

In this manner, when the lamination direction Xs of the inspection object H and the slit arrangement direction Xh of the grids 12, 14, and 15 are aligned in parallel to each other, the inner state of the inspection object H can be visualized at high definition in a reconstructed image (in the present embodiment, a differential phase image as described later).

The following describes an exemplary inspection object H as the target of quality inspection by the X-ray Talbot imaging system 1 according to the present embodiment, together with the formation process thereof.

First, a device configured to form a three-dimensional laminated shaped product as the inspection object H is briefly described.

Figure 5:
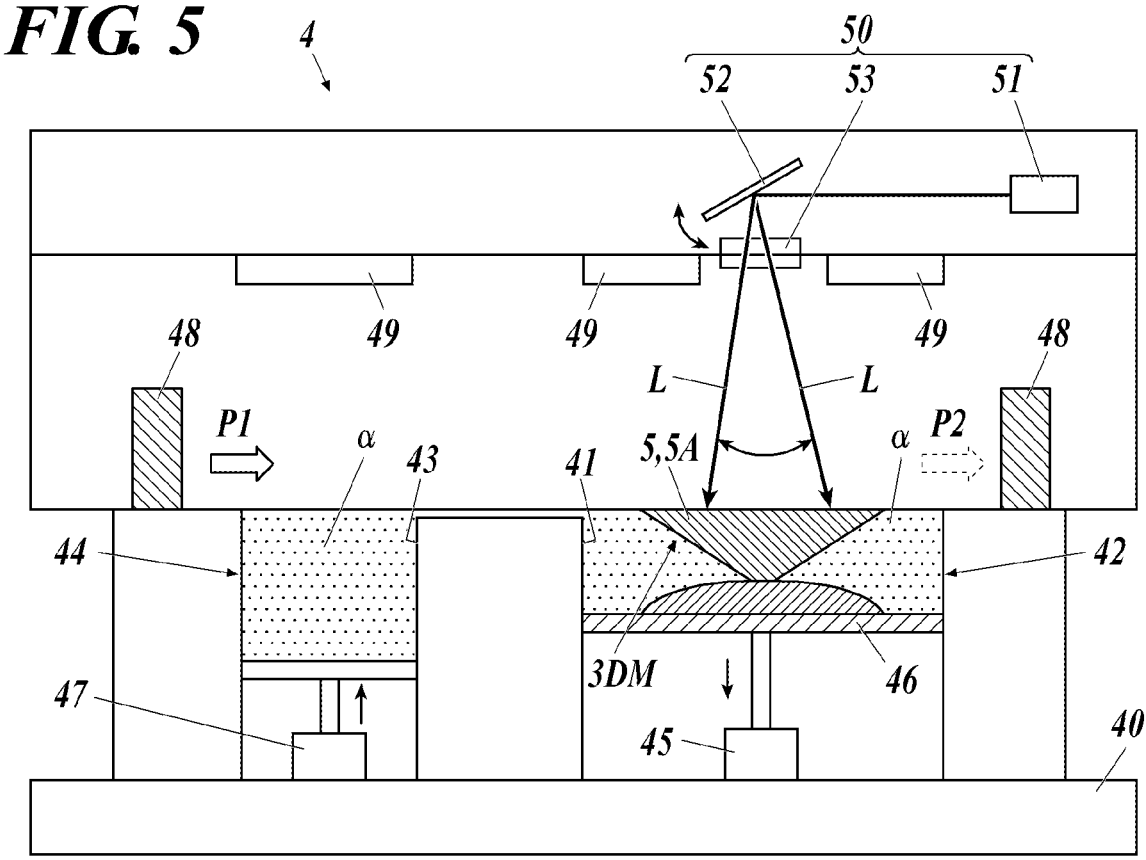
FIG. 5 is a schematic view illustrating the entire configuration of a device configured to generate the inspection object.

FIG. 5 is a schematic view illustrating an exemplary configuration of a three-dimensional laminated shaped product formation device.

As illustrated in FIG. 5, a three-dimensional laminated shaped product formation device 4 includes, for example, a shaper 42 that has a first opening 41 and in which a three-dimensional laminated shaped product is shaped, a constituent material supplier 44 that has a second opening 43 having an opening end edge substantially flush with an opening end edge of the first opening 41 and is a space inside which the constituent material cc is accumulated, and a support foundation 40 that supports these components.

A shaping stage 46 supported by a stage support 45 is disposed in the shaper 42 and precisely movable in the vertical direction by the stage support 45.

An up-down movement lift 47 including a supply piston configured to move up and down in the constituent material supplier 44 is provided at a bottom in the constituent material supplier 44, and can push the constituent material cc accumulated in the constituent material supplier 44 upward as appropriate.

The device includes a powder recoater 48 that is movable in the horizontal direction (arrow direction in FIG. 5) from Position P1 to Position P2 through the second opening 43 of the constituent material supplier 44 and the first opening 41 of the shaper 42 by a movement mechanism (not illustrated).

The powder recoater 48 forms a thin layer 5 on the shaping stage 46 by paving the shaping stage 46 flatly with the constituent material cc supplied from the inside of the constituent material supplier 44 as appropriate.

The device also includes a temperature adjuster 49 configured to heat or cool the surface of the thin layer 5 formed on the shaping stage 46 or the inside of the device, and a laser light radiator 50 configured to radiate the thin layer 5 with laser light L to form a shaped product layer 5A made of the constituent material cc of the thin layer 5 through melting and bonding.

The laser light radiator 50 includes a laser light source 51 and a Galvano mirror 52. The laser light radiator 50 may further include a lens or the like for adjusting the focal length of the laser light L to the surface of the thin layer 5. In the present embodiment, the laser light L radiated from the laser light source 51 and reflected by the Galvano mirror 52 is incident on the thin layer 5 through a laser light window 53.

The laser light source 51 may be any light source configured to emit the laser light L having a desired wavelength, for example, at an energy density E of 45 J/mm$^2$ to 150 J/mm$^2$. The laser light source 491 may be, for example, a carbon dioxide gas laser, a YAG laser, an excimer laser, a He—Cd laser, a semiconductor excitation solid laser, or a fiber laser.

The Galvano mirror 52 may include an X mirror configured to reflect the laser light L emitted from the laser light source 51 and scan the laser light L in the x direction, and a Y mirror configured to reflect the laser light L emitted from the laser light source 51 and scan the laser light L in the Y direction. The laser light window 53 only needs to be made of material that transmits the laser light L.

The shaped product layer 5A is formed on the shaping stage 46 sequentially through the formation of the thin layer 5 by the powder recoater 48 and the like, the temperature adjustment by the temperature adjuster 49, and the radiation with the laser light L by the laser light radiator 50, and the shaping stage 46 moves down as appropriate along with the formation of the shaped product layer 5A while being supported by the stage support 45. Then, a three-dimensional laminated shaped product 3DM is shaped on the shaping stage 46 through lamination of the shaped product layer 5A.

The configuration of the device configured to form a three-dimensional laminated shaped product as the inspection object H is not limited to that exemplarily described above. Various devices configured to form the shaped product by laminating a plurality of layers of the constituent material cc may be used as the device configured to form the inspection object H.

The following specifically describes exemplary three-dimensional laminated shaped products as the inspection object H formed by the three-dimensional laminated shaped product formation device 4.

<Example 1 of Inspection Object H (Case in which Inspection Object H is Optically Shaped Product)>

First, trimethylolpropane triacrylate as an active energy ray curable compound and diphenyl (2,4,6-trimethyl benzoyl) phosphine oxide as a photopolymerization initiator were mixed. Then, this mix liquid was dispersed by a homogenizer and then, methyl ethyl ketone was devolatilized by an evaporator, thereby obtaining resin composition as the constituent material cc.

Then, the resin composition as the constituent material cc was input to the constituent material supplier 44 included in the three-dimensional laminated shaped product formation device 4, and the thin layer 5 of the resin composition as the constituent material cc was formed on the shaping stage 46 in the shaper (shaping tank) 42.

In addition, radiation of the thin layer 5 with the laser light L (for example, semiconductor laser light having a power of 100 mW and a wavelength of 355 nm) from the laser light radiator 50 and downward movement of the shaping stage 46 were repeated to form a three-dimensional laminated shaped product (the inspection object H) having a length (hereinafter, the depth direction of the shaping tank; the length of a three-dimensional shaped product in the height method is also simply referred to as "length") of 320 mm, a width of 10 mm, and a thickness of 4 mm.

<Example 2 of Inspection Object H (Case in which Inspection Object H is Shaped Product Formed by Powder Sintering Lamination Shaping Method)>

PA12 (DAIAMID L1600 manufactured by Daicel-Evonik Ltd.) was prepared as resin material, and resin fine particles were ground by a mechanical grinding method until an average particle diameter measured by a laser diffraction granularity distribution measurement device (HELOS manufactured by Sympatec GmbH) including a wet disperser became equal to 50 μm, thereby obtaining the constituent material cc.

The thin layer 5 having a thickness of 0.1 mm was formed by paving the shaping stage 46 of the three-dimensional laminated shaped product formation device 4 that employs a powder bed fusion method, with powder material as the constituent material cc. Then, the thin layer 5 was radiated under conditions listed below with the laser light L in the range of 15 mm×20 mm from a 50 W fiber laser (manufactured by SPI Lasers Limited) on which a YAG wavelength Galvanometer scanner as the laser light radiator 50 was mounted, and 10 of such layers were laminated to form a three-dimensional laminated shaped product as the inspection object H.

Laser wavelength: 1.07 μm
Beam diameter: 170 μm at thin layer surface
Scanning interval: 0.2 mm
Laser: power 20 W
Scanning speed: 5000 mm/sec
Standby temperature: set to be core resin softening temperature of −25° C.

<Example 3 of Inspection Object H (Case in which Inspection Object H is Shaped Product Formed by Fused Deposition Modeling Method)>

PA12 resin (DAIAMID L1600 manufactured by Daicel-Evonik Ltd.) was input to a small-sized kneader manufactured by Xplore Instruments BV and kneaded at 180° C. and 100 rpm, and the melted material was wound by a winding device, thereby producing a filament as the constituent material cc having a diameter of 1.75 mm.

Then, formation and lamination of the thin layer 5 were repeated while the filament produced at a melting temperature of 180° C. by using Zortrax M200 and having a diameter of 1.75 mm was melted, thereby forming a dumbbell test piece having a length of 150 mm as a three-dimensional laminated shaped product as the inspection object H.

<Example 4 of Inspection Object H (Case in which Inspection Object H is Three-Dimensional Laminated Shaped Product Made of Metallic Material)>

A three-dimensional laminated shaped product as the inspection object H in the present embodiment is not limited to a three-dimensional laminated shaped product containing resin as the constituent material cc as described above, but may be a three-dimensional laminated shaped product containing metallic material as the constituent material cc as described below.

The following describes an example in which a three-dimensional laminated shaped product (the inspection object H) as a cube of 10 mm×10 mm×10 mm was formed under an argon gas atmosphere by using the three-dimensional laminated shaped product formation device 4 by the following method.

A metal powder supplier as the constituent material supplier 44 was filled with metal powder (iron, iron alloy, nickel, nickel alloy, cobalt, cobalt alloy, copper, copper alloy, aluminum, aluminum alloy, or the like) as the constituent material cc, and the up-down movement lift 47 was moved up to push the metal powder (constituent material cc) upward. Then, the thin layer 5 was formed by horizontally paving the shaping stage 46 with metal powder (the constituent material cc) at the thickness of 0.2 mm by using the powder recoater 48 while performing thickness regulation.

The laser light radiator 50 includes a fiber laser (having a wavelength of 1.07 μm, a power of 300 W at 100%, and an energy density of 120 J/mm$^2$) as the laser light source 51, 3D Galvano scanning head (manufactured by ARGES GmbH) as the Galvano mirror 52, and a single focus lens (f100). The shaped product layer 5A was formed by performing sintering treatment of performing, at two stages, laser light radiation of the area of 10 mm×10 mm at a scanning speed of 2000 mm/sec and a scanning pitch of 40 μm under a condition that a focal point spot of metal powder (the constituent material cc) at the surface of the thin layer 5 is 30 μm. The first radiation process was performed while the power of the laser light source 51 was 100 W, and then the second radiation process was performed with the power condition changed to 300 W.

In addition, the lamination of a second thin layer 5 having a thickness of 0.2 mm on the formed first structured product layer 5A and the laser radiation sintering treatment thereof were repeated 50 times by the same method as described above, thereby forming a three-dimensional laminated shaped product (the inspection object H) having a thickness of 10 mm.

The above-described three-dimensional laminated shaped product is an exemplary three-dimensional laminated shaped product (the inspection object H), and a three-dimensional laminated shaped product (the inspection object H) to which the quality inspection method according to the present embodiment is applicable is not limited to the exemplary three-dimensional laminated shaped product described above. The quality inspection method according to the present embodiment is widely applicable to any three-dimensional laminated shaped product (the inspection object H) formed by laminating a plurality of thin layers 5 of the constituent material cc.

[Quality Inspection Method for Three-Dimensional Laminated Shaped Product]

The following describes the quality inspection method for a three-dimensional laminated shaped product in the present embodiment.

First, the inspection object H formed by a method as described above is placed on the subject table 13 of the X-ray Talbot imaging system 1 when quality inspection of a three-dimensional laminated shaped product is performed by the quality inspection method in the present embodiment.

In this case, as illustrated in FIG. 4B, the inspection object H is placed on the subject table 13 so that the lamination direction Xh of the layers of the inspection object H and the arrangement direction Xs of the plurality of slits S of the plurality of grids (in the present embodiment, the radiation source grid 12, the first grid 14, and the second grid 15) are parallel to each other.

Then, the controller 19 controls the X-ray generation device 11 so that the X-ray source 11a radiates an X-ray to which the inspection object H is exposed at an average energy of 15 keV to 50 keV, and performs imaging.

In the present embodiment, as described above, for each of a case in which the inspection object H is placed on the subject table 13 and a case in which the inspection object H is not placed on the subject table 13, a plurality of moire images are acquired by repeating processing of moving at least one of the plurality of grids 12, 14, and 15 in the direction orthogonal to the X-ray radiation direction and reading an image signal by the X-ray detector 16 in accordance with an X-ray radiated by the X-ray generation device 11 (the X-ray source 11a of the X-ray generation device 11) each time the slits S of the grid move by a constant periodic interval. Then, a reconstructed image of the inspection object H is produced on the basis of the plurality of moire images captured while the inspection object H is placed and the plurality of moire images captured while the inspection object H is not placed, and the reconstructed image of the inspection object H is provided with correction of an artifact attributable to an imaging condition difference between the case in which the moire images with the inspection object H are captured and the case in which the moire images without the inspection object H are captured.

Examples of the reconstructed image of the inspection object H, which is obtained on the basis of the moire images Mo, include an absorption image, a differential phase image, and a small-angle scattering image as described above.

Figure 6A:
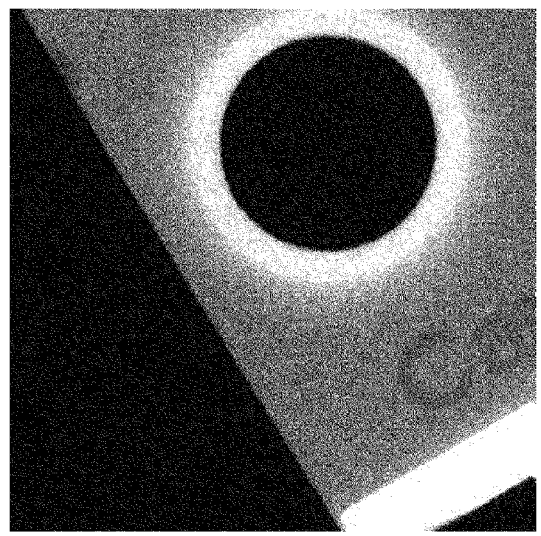
FIG. 6A is a diagram illustrating an exemplary absorption image of the inspection object.
Figure 6B:
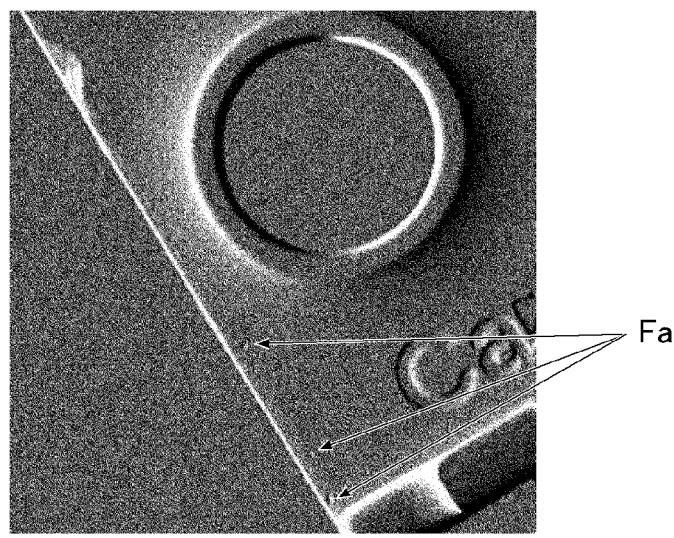
FIG. 6B is a diagram illustrating an exemplary differential phase image of the inspection object.

FIG. 6A is a diagram illustrating an exemplary absorption image as the reconstructed image of the inspection object H (in this example, the inspection object H (optically shaped product) of Example 1 described above), which is obtained on the basis of the moire images Mo, and FIG. 6B is a diagram illustrating an exemplary differential phase image as the reconstructed image of the inspection object H (the inspection object H (optically shaped product) of Example 1 as in FIG. 6A), which is obtained on the basis of the moire images Mo.

Figure 7A:
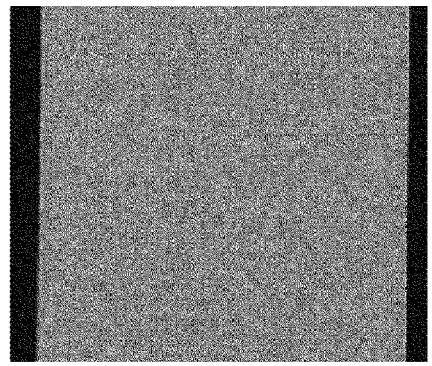
FIG. 7A is a diagram illustrating an exemplary absorption image of an inspection object formed by a mold injection method.
Figure 7B:
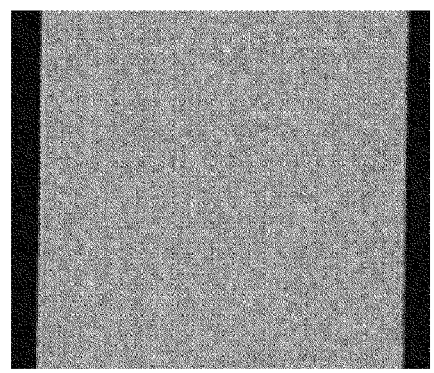
FIG. 7B is a diagram illustrating an exemplary absorption image of an inspection object formed by a powder sintering lamination shaping method.
Figure 7C:
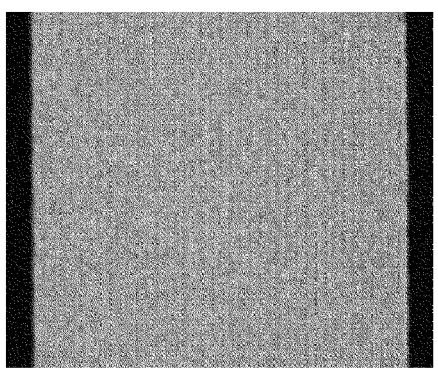
FIG. 7C is a diagram illustrating an exemplary absorption image of an inspection object formed by a fused deposition modeling shaping method.

FIG. 7A is a diagram illustrating an exemplary absorption image of an inspection object formed by a mold injection method, FIG. 7B is a diagram illustrating an exemplary absorption image of an inspection object (the inspection object H of Example 2) formed by a powder sintering lamination shaping method, and FIG. 7C is a diagram illustrating an exemplary absorption image of an inspection object (the inspection object H of Example 3) formed by a fused deposition modeling shaping method.

As illustrated in FIGS. 6A and 7A to 7C, in the absorption image, an image is entirely blurred whether the inspection object H is not a three-dimensional laminated shaped product but a mold injection product or is a three-dimensional laminated shaped product, and an anomaly such as a void space inside the inspection object H cannot be read from the image.

However, as illustrated in FIG. 6B, irregularity and the like of the inspection object H can be sharply expressed in the differential phase image, and for example, when there is an anomaly such as entrainment of the air bubble Fa inside the inspection object H, this anomalous part can be read from the image.

Thus, in the present embodiment, in particular, the differential phase image among the reconstructed images of the inspection object H, which is obtained on the basis of the moire images Mo, is used to perform quality inspection of the inner state of a three-dimensional laminated shaped product as the inspection object H.

Figure 8A:
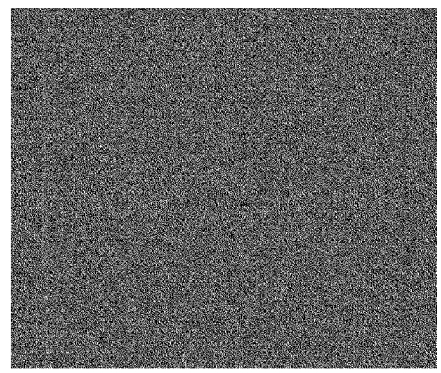
FIG. 8A is a diagram illustrating an exemplary differential phase image of the inspection object formed by the mold injection method.
Figure 8B:
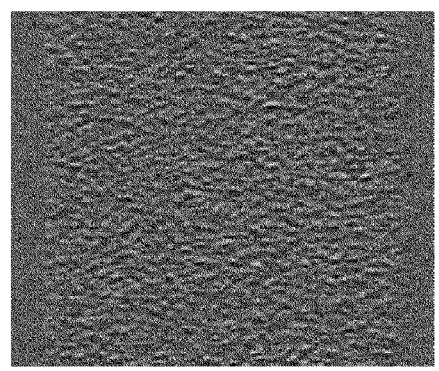
FIG. 8B is a diagram illustrating an exemplary differential phase image when the lamination direction of the inspection object formed by the powder sintering lamination shaping method is orthogonal to the slit arrangement direction of the grids.
Figure 8C:
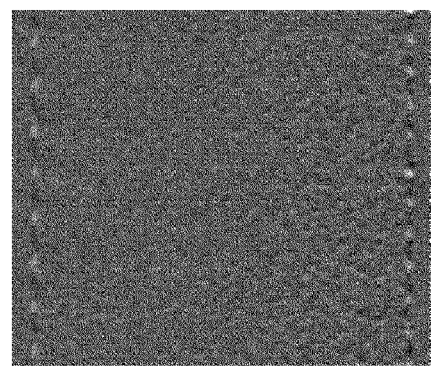
FIG. 8C is a diagram illustrating an exemplary differential phase image when the lamination direction of the inspection object formed by the fused deposition modeling shaping method is orthogonal to the slit arrangement direction of the grids.

FIG. 8A is a diagram illustrating an exemplary differential phase image of the inspection object formed by the mold injection method, FIG. 8B is a diagram illustrating an exemplary differential phase image when the lamination direction of the inspection object (the inspection object H of Example 2) formed by the powder sintering lamination shaping method is orthogonal to the slit arrangement direction of the grids 12, 14, and 15, and FIG. 8C is a diagram illustrating an exemplary differential phase image when the lamination direction of the inspection object (the inspection object H of Example 3) formed by the fused deposition modeling shaping method is orthogonal to the slit arrangement direction of the grids 12, 14, and 15.

As illustrated in FIG. 8A, in the case of the inspection object formed by the mold injection method, the appearance of the differential phase image does not largely differ from that of the absorption image.

However, as illustrated in FIGS. 8B and 8C, in the case of a three-dimensional laminated shaped product formed by laminating a plurality of thin layers of the constituent material cc, such as the inspection object (the inspection object H of Example 2) formed by the powder sintering lamination shaping method or the inspection object (the inspection object H of Example 3) formed by the fused deposition modeling shaping method, the inner state of the inspection object H is slightly expressed in the differential phase image unlike the absorption image.

However, when the lamination direction of the inspection object H is orthogonal to the slit arrangement direction of the grids 12, 14, and 15, the image is not sharp, and a void space or the like inside the inspection object H cannot be highly accurately identified.

Figure 9A:
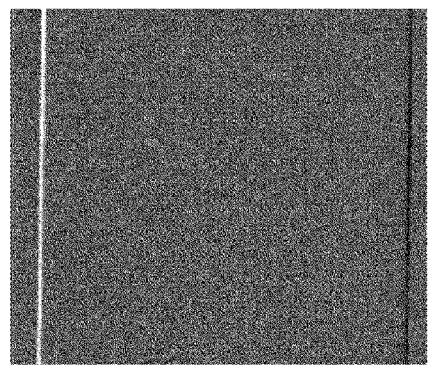
FIG. 9A is a diagram illustrating an exemplary differential phase image of the inspection object formed by the mold injection method.
Figure 9B:
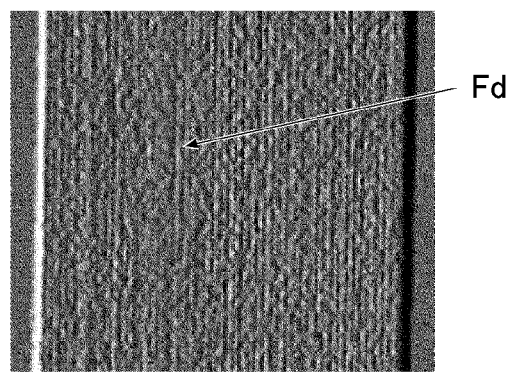
FIG. 9B is a diagram illustrating an exemplary differential phase image when the lamination direction of the inspection object formed by the powder sintering lamination shaping method is parallel to the slit arrangement direction of the grids.
Figure 9C:
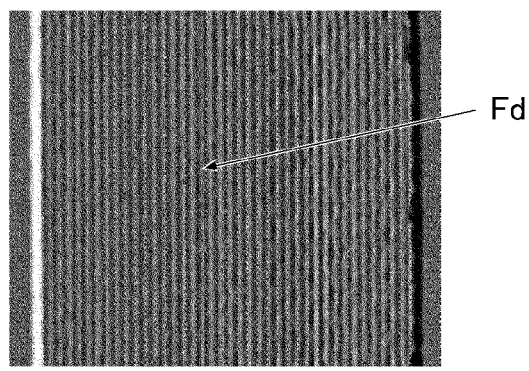
FIG. 9C is a diagram illustrating an exemplary differential phase image when the lamination direction of the inspection object formed by the fused deposition modeling shaping method is parallel to the slit arrangement direction of the grids.

FIG. 9A is a diagram illustrating an exemplary differential phase image of the inspection object formed by the mold injection method, FIG. 9B is a diagram illustrating an exemplary differential phase image when the lamination direction of the inspection object (the inspection object H of Example 2) formed by the powder sintering lamination shaping method and the slit arrangement direction of the grids 12, 14, and 15 are parallel to each other, and FIG. 9C is a diagram illustrating an exemplary differential phase image when the lamination direction of the inspection object (the inspection object H of Example 3) formed by the fused deposition modeling shaping method and the slit arrangement direction of the grids 12, 14, and 15 are parallel to each other.

As illustrated in FIG. 9A, in the case of the inspection object formed by the mold injection method, similarly to FIG. 8A, the appearance of the differential phase image does not largely differ from that of the absorption image.

However, as illustrated in FIGS. 9B and 9C, the inner state of the inspection object H is sharply expressed in the differential phase image when imaging is performed so that the lamination direction of the inspection object H and the slit arrangement direction of the grids 12, 14, and 15 are parallel to each other in the case of a three-dimensional laminated shaped product formed by laminating a plurality of thin layers of the constituent material cc, such as the inspection object (the inspection object H of Example 2) formed by the powder sintering lamination shaping method or the inspection object (the inspection object H of Example 3) formed by the fused deposition modeling shaping method. Accordingly, for example, when the gap Fd or the like is generated, for example, between the laminated thin layers 5 of the constituent material cc inside the inspection object H, this anomalous part can be highly accurately read from the image.

[Effects of Quality Inspection Method for Three-Dimensional Laminated Shaped Product]

According to the present embodiment, as described above, when the inspection object H is a three-dimensional laminated shaped product formed into a three-dimensional shape by laminating multiple layers of the constituent material cc, a reconstructed image is generated by performing imaging by the X-ray Talbot imaging system 1 while the inspection object H is placed on the subject table 13 so that at least the lamination direction of the layers of the inspection object H and the arrangement direction of the plurality of slits S of the plurality of grids 12, 14, and 15 are parallel to each other. Then, the inner state of the inspection object H is inspected on the basis of the reconstructed image.

Anomalies such as entrainment of the minute air bubble Fa and generation of the gap Fd between laminated layers of the constituent material cc at formation of a three-dimensional laminated shaped product are extremely minute, and thus it is difficult to identify an anomalous part from a captured image thereof by performing normal X-ray imaging or the like.

However, clear contrast is obtained between a void space part of the inspection object H such as the air bubble Fa or the gap Fd and the other part when, as in the present embodiment, X-ray Talbot imaging is performed and in addition, the inspection object H is disposed at the imaging so that the lamination direction of the layers of the inspection object H and the arrangement direction of the plurality of slits S of the plurality of grids 12, 14, and 15 are parallel to each other.

Accordingly, it is possible to identify a minute anomalous part from the captured image and thus easily and quickly perform quality inspection without destroying the three-dimensional laminated shaped product as the inspection object H.

Since the three-dimensional laminated shaped product (the inspection object H) can be inspected in a non-destructive manner, the entire product can be inspected without excessive work nor time, and quality management of the product as the three-dimensional laminated shaped product (the inspection object H) can be performed at high level as compared to when only partial inspection is performed.

In the present embodiment, the X-ray source 11a radiates an X-ray to which the inspection object H is exposed at an average energy of 15 keV to 50 keV.

When the inspection object H is exposed to an X-ray having relatively low energy in this manner, sufficient contrast is obtained between a void space part such as the air bubble Fa (refer to FIG. 6B) or the gap Fd (refer to FIGS. 9B and 9C) inside the inspection object H as a three-dimensional laminated shaped product and the other part, and thus it is possible to visualize the existence of extremely minute anomalous parts such as the air bubble Fa and the gap Fd that are minute inside the inspection object H.

In the present embodiment, for each of a case in which the inspection object H is placed on the subject table 13 and a case in which the inspection object H is not placed on the subject table 13, a plurality of moire images are acquired by repeating processing of moving at least one of the plurality of grids 12, 14, and 15 in the direction orthogonal to the X-ray radiation direction and reading an image signal by the X-ray detector 16 in accordance with an X-ray radiated by the X-ray generation device 11 (the X-ray source 11a of the X-ray generation device 11) each time the slits S of the grid move by a constant periodic interval. Then, a reconstructed image of the inspection object H is produced on the basis of the plurality of moire images captured while the inspection object H is placed and the plurality of moire images captured while the inspection object H is not placed, and the reconstructed image of the inspection object H is provided with correction of an artifact attributable to an imaging condition difference between the case in which the moire images with the inspection object H are captured and the case in which the moire images without the inspection object H are captured.

Accordingly, it is possible to remove noise contained in the image and obtain the reconstructed image at higher quality.

Thus, it is possible to clearly visualize the existence of extremely minute anomalous parts such as the air bubble Fa and the gap Fd that are minute inside the inspection object H.

Second Embodiment

The following describes a second embodiment of the quality inspection method for a three-dimensional laminated shaped product according to the present invention with reference to FIGS. 10A to 10F and 11. The present embodiment is different from the first embodiment only in the configuration of the three-dimensional laminated shaped product and the content of quality inspection, and thus the following description is mainly made on any difference from the first embodiment.

Figure 10A:
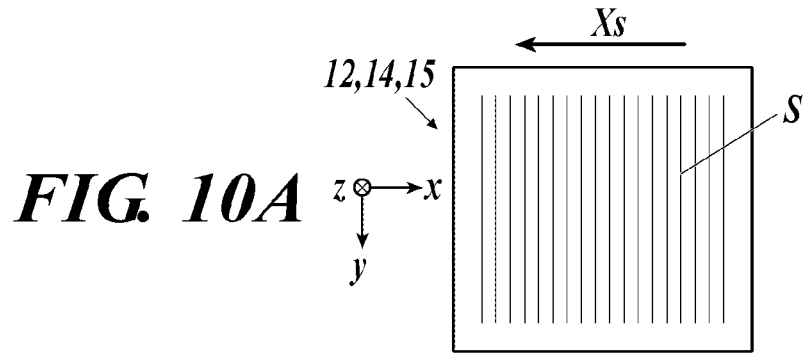
FIG. 10A is a plan view of the grids when viewed in an X-ray radiation direction.
Figure 10B:
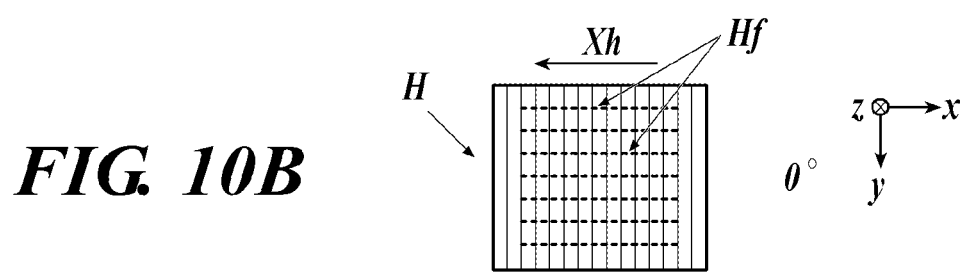
FIG. 10B is a plan view of the inspection object placed on a subject table when viewed in the X-ray radiation direction.
Figure 10C:
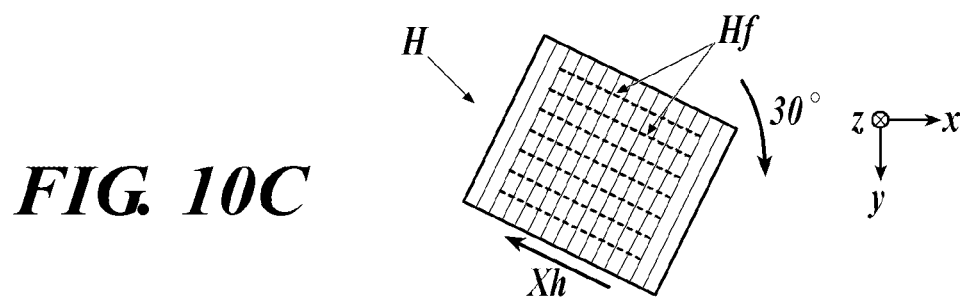
FIG. 10C is a plan view of the inspection object placed on the subject table when viewed in the X-ray radiation direction.
Figure 10D:
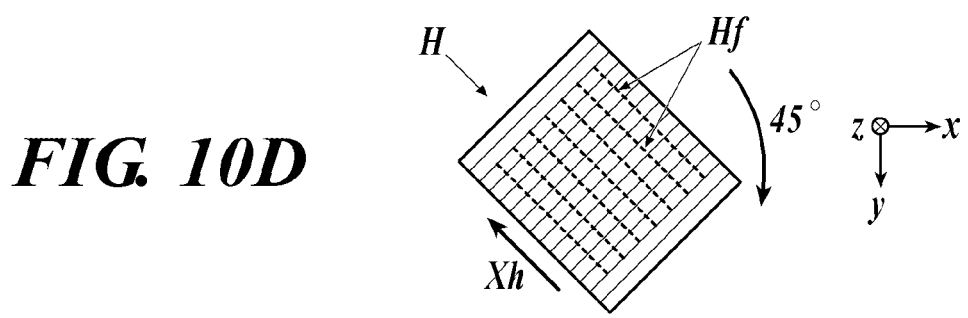
FIG. 10D is a plan view of the inspection object placed on the subject table when viewed in the X-ray radiation direction.

FIG. 10A is a plan view of the grids 12, 14, and 15 when viewed in an X-ray radiation direction. FIGS. 10B to 10F are each a plan view of an inspection object placed on the subject table 13 when viewed in the X-ray radiation direction: FIG. 10B illustrates a case in which the orientation of the inspection object H (the lamination direction Xh of the inspection object H) is angled at 0° relative to the arrangement direction Xs of the slits S of the grids 12, 14, and 15 (in other words, the lamination direction Xh of the inspection object H is parallel to the arrangement direction Xs of the slits S); FIG. 10C illustrates a case in which the orientation of the inspection object H is angled at 30° relative to the arrangement direction Xs of the slits S of the grids 12, 14, and 15; FIG. 10D illustrates a case in which the orientation of the inspection object H is angled at 45° relative to the arrangement direction Xs of the slits S of the grids 12, 14, and 15; FIG. 10E illustrates a case in which the orientation of the inspection object H is angled at 60° relative to the arrangement direction Xs of the slits S of the grids 12, 14, and 15; and FIG. 10F illustrates a case in which the orientation of the inspection object H is angled at 90° relative to the arrangement direction Xs of the slits S of the grids 12, 14, and 15 (in other words, the lamination direction Xh of the inspection object H is orthogonal to the arrangement direction Xs of the slits S).

FIGS. 10B to 10F exemplarily illustrate a case in which fiber material Hf contained inside the inspection object H as a three-dimensional laminated shaped product is oriented in an orientation orthogonal to the lamination direction Xh of the three-dimensional laminated shaped product.

In the present embodiment, the three-dimensional laminated shaped product as the inspection object H is formed of the constituent material cc that is composite resin such as fiber reinforcement plastic containing, as reinforcement material, fiber material such as glass fiber or carbon fiber.

The quality inspection method in the present embodiment quantifies, on the basis of a reconstructed image of the inspection object H, which is obtained on the basis of the moire images Mo, the orientation state of fiber inside the three-dimensional laminated shaped product as the inspection object H formed of the constituent material cc that is composite resin containing fiber material.

The present embodiment describes an example in which, in particular, the small-angle scattering image (small-angle scattering signal value) among the reconstructed images of the inspection object H, which is obtained on the basis of the moire images Mo, is used to quantify the orientation state of fiber inside the three-dimensional laminated shaped product as the inspection object H.

<Example 4 of Inspection Object H (Case in which Inspection Object H is Shaped Product of Composite Resin Containing Fiber Material)>

The following first describes an exemplary inspection object H in the present embodiment together with the formation process thereof.

When the inspection object H according to the present embodiment is formed, first, 1 kg of PA12 resin (DAIAMID L1600 manufactured by Daicel-Evonik Ltd.), 25 L of ethanol, 10.1 g of nano cellulose (1 mass % in the resin composition) were agitated at 145° C. in an autoclave agitation pot of 100 L for one hour. Thereafter, the autoclave temperature was cooled to 117° C. and maintained constant for 60 minutes. Then, the resin composition was cooled, and the resin composition in particles (hereinafter also simply referred to as "particles") having an average particle diameter of 50 μm was obtained as the constituent material cc.

The resin composition (the constituent material cc) in particles obtained as described above was used to perform the powder sintering lamination shaping method (refer to Example 2 of the inspection object H in the first embodiment), thereby obtaining the inspection object H (three-dimensional laminated shaped product) made of the composite resin containing the fiber material Hf.

In the present embodiment, imaging by the X-ray Talbot imaging system 1 is performed a plurality of times while the inspection object H (three-dimensional laminated shaped product) is rotated about the X-ray radiation axis so that the orientation of the inspection object H changes relative to the arrangement direction Xs of the slits S of the grids 12, 14, and 15.

It is possible to set, as appropriate, an amount by which the orientation of the inspection object H is changed relative to the arrangement direction Xs of the slits S of the grids 12, 14, and 15 and the times of repetition of the imaging.

In the present embodiment, for example, the angle of 0° is defined at a position where the lamination direction Xh of the inspection object H and the slit arrangement direction Xs of the grids 12, 14, and 15 are parallel to each other (refer to FIG. 10B), and imaging is performed while the inspection object H is rotated from the position at the angle of 0° to a position (the angle of 90°) where the lamination direction Xh of the inspection object H is orthogonal to the slit arrangement direction Xs of the grids 12, 14, and 15 so that the orientation of the inspection object H changes relative to the arrangement direction Xs of the slits S of the grids 12, 14, and 15.

In the present embodiment, the grids 12, 14, and 15 are fixed to the device, and the arrangement direction Xs of the slits S of the grids 12, 14, and 15 (grid angle) is known to the device side in advance. Thus, it is possible to relatively change the orientation of the inspection object H and the arrangement direction Xs of the slits S of the grids 12, 14, and 15 by rotating the inspection object H about the X-ray radiation axis to change the angle by a predetermined amount.

The orientation of the inspection object H and the arrangement direction Xs of the slits S of the grids 12, 14, and 15 only need to be relatively changed, and for example, the orientation of the inspection object H may be fixed in a case of the configuration in which the grids 12, 14, and 15 can be rotated.

In the present embodiment, the subject table 13 of the X-ray Talbot imaging system 1 is preferably provided with a rotation stage (not illustrated) or the like configured to rotate the inspection object H about the X-ray radiation axis by a predetermined amount.

The other configuration is same as that of the first embodiment, and thus any identical component is denoted by an identical reference sign, and description thereof is omitted.

[Quality Inspection Method for Three-Dimensional Laminated Shaped Product]

The following describes the quality inspection method for a three-dimensional laminated shaped product in the present embodiment.

Similarly to the first embodiment, the inspection object H formed by a method as described above is placed on the subject table 13 of the X-ray Talbot imaging system 1 when quality inspection of a three-dimensional laminated shaped product is performed by the quality inspection method in the present embodiment.

In this case, first, as illustrated in FIGS. 10A and 10B, the inspection object H is placed on the subject table 13 so that the lamination direction Xh of the layers of the inspection object H and the arrangement direction Xs of the plurality of slits S of the plurality of grids (in the present embodiment, the radiation source grid 12, the first grid 14, and the second grid 15) are parallel to each other.

Then, the controller 19 controls the X-ray generation device 11 so that the X-ray source 11a radiates an X-ray to which the inspection object H is exposed at an average energy of 15 keV to 50 keV, and performs imaging.

Subsequently, the inspection object H placed on the subject table 13 is rotated about the X-ray radiation axis by a predetermined amount, and imaging is performed as before. Such imaging is repeated a plurality of times.

In the present embodiment, as illustrated in FIGS. 10B to 10F, the inspection object H is rotated clockwise from the state (refer to FIG. 10B) of angle of 0° at a position where the lamination direction Xh of the inspection object H and the slit arrangement direction Xs of the grids 12, 14, and 15 are parallel to each other, and imaging is performed at each of positions at five angles such as the position at the angle of 0°, the position at the angle of 30° (refer to FIG. 10C), the position at the angle of 45° (refer to FIG. 10D), the position at the angle of 60° (refer to FIG. 10E), and the position at the angle of 90° (in other words, position where the lamination direction Xh of the inspection object H is orthogonal to the slit arrangement direction Xs of the grids 12, 14, and 15; refer to FIG. 10F).

Then, a reconstructed image (in the present embodiment, the small-angle scattering image, in particular) is generated from the moire images Mo acquired by the imaging.

FIG. 11 is a table indicating the correspondence relation between the orientation (angle) of the inspection object H and the small-angle scattering signal value at each angle.

In the present embodiment, the small-angle scattering signal value means the average value of small-angle scattering signal values across the entire screen or an image range having an optional area.

In FIG. 11, "0° (vertical)" indicates that the fiber orientation is orthogonal to the slit arrangement direction Xs at the position of angle of 0° where the lamination direction Xh of the inspection object H and the slit arrangement direction Xs of the grids 12, 14, and 15 are parallel to each other. In addition, "90° (parallel)" indicates that the fiber orientation is parallel to the slit arrangement direction Xs at the position of angle of 90° where the lamination direction Xh of the inspection object H is orthogonal to the slit arrangement direction Xs of the grids 12, 14, and 15.

As illustrated in FIG. 11, when the inspection object H (three-dimensional laminated shaped product) containing fiber material is imaged, the small-angle scattering signal value is smallest at 0.15 when the fiber orientation inside the three-dimensional laminated shaped product as the inspection object H is orthogonal to the arrangement direction Xs of the plurality of slits S of the plurality of grids (in the present embodiment, the radiation source grid 12, the first grid 14, and the second grid 15), and the value increases as the fiber orientation becomes parallel to the arrangement direction Xs of the plurality of slits S of the plurality of grids (in the present embodiment, the radiation source grid 12, the first grid 14, and the second grid 15). Then, the small-angle scattering signal value is largest at 0.42 when the fiber orientation is parallel to the arrangement direction Xs of the plurality of slits S of the plurality of grids (in the present embodiment, the radiation source grid 12, the first grid 14, and the second grid 15).

Accordingly, it is possible to quantify the orientation state of fiber inside the three-dimensional laminated shaped product as the inspection object H by performing imaging a plurality of times while rotating the inspection object H about the X-ray radiation axis by a predetermined amount to change the angle relative to the arrangement direction Xs of the plurality of slits S of the plurality of grids (in the present embodiment, the radiation source grid 12, the first grid 14, and the second grid 15) and by comparing and analyzing the small-angle scattering signal value obtained by each imaging.

As described above, the present embodiment can achieve effects same as those of the first embodiment and also achieve effects as follow.

Specifically, in the present embodiment, when the inspection object H is a three-dimensional laminated shaped product formed of the constituent material cc that is composite resin containing fiber material, imaging is performed a plurality of times while the inspection object H is rotated about the X-ray radiation axis so that the orientation of the inspection object H changes relative to the arrangement direction Xs of the slits S of the grids 12, 14, and 15.

Accordingly, a plurality of reconstructed images (in the present embodiment, small-angle scattering images) in different fiber orientation states relative to the arrangement direction Xs of the slits S of the grids 12, 14, and 15 can be obtained, and the orientation state of fiber inside the three-dimensional laminated shaped product as the inspection object H can be quantified by comparing and analyzing the obtained small-angle scattering signal values without destroying the three-dimensional laminated shaped product.

Specifically, as illustrated in FIG. 11, the correlation that the small-angle scattering signal value is smallest when the fiber orientation is orthogonal to the arrangement direction Xs of the slits S, the small-angle scattering signal value increases as the fiber orientation becomes parallel to the arrangement direction Xs of the slits S, and the small-angle scattering signal value is largest when the fiber orientation is parallel to the arrangement direction Xs of the slits S is observed between the fiber orientation and the small-angle scattering signal value.

Thus, it is possible to know the state of the fiber orientation relative to the arrangement direction Xs of the slits S of the grids 12, 14, and 15 by performing imaging while changing the orientation (angle) of the inspection object H and obtaining the small-angle scattering signal value at each orientation (angle).

Although the embodiments of the present invention are described above, the present invention is not limited to those embodiments and may be modified in various manners without departing from the scope thereof.

For example, the second embodiment exemplarily describes the case in which imaging is performed while the orientation (angle) of the inspection object H is changed at the five stages, but the number of orientation stages at which imaging is performed is not particularly limited.

For example, imaging may be performed at a larger number of angle positions or may be performed at a smaller number of angle positions. When imaging is performed at five angles, the angle positions at which imaging is performed are not limited to 0°, 30°, 45°, 60°, and 90°, which are described in the present embodiment.

Imaging may be continuously performed while the orientation (angle) of the inspection object H is linearly changed, and it may be determined that the arrangement direction Xs of the slits S and the fiber orientation are aligned with each other when the small-angle scattering signal value becomes largest.

The fiber orientation state can be more highly accurately determined by performing imaging a larger number of times while minutely changing the orientation (angle) of the inspection object H.

When the fiber orientation state is quantified by performing imaging a small number of times such as three stages, for example, data of the correlation between the fiber orientation and the small-angle scattering signal value may be acquired in advance, and the orientation (angle) of the inspection object H at which the small-angle scattering signal value has a peak (in other words, the arrangement direction Xs of the slits S and the fiber orientation are aligned with each other) may be estimated by referring to the data.

INDUSTRIAL APPLICABILITY

The quality inspection method according to the present invention is industrially applicable to quality inspection of the inner state of a three-dimensional laminated shaped product without destroying the three-dimensional laminated shaped product.

REFERENCE SIGNS LIST

1 X-ray Talbot imaging system
2 inputter
3 display
11 X-ray generation device
11a X-ray source
12 radiation source grid
13 subject table
14 first grid
15 second grid
16 X-ray detector
H inspection object

The invention claimed is:

1. A quality inspection method using an X-ray Talbot imaging system in which: an X-ray source configured to radiate an X-ray; a plurality of grids in each of which a plurality of slits are arranged in a direction orthogonal to a radiation axis direction of the X-ray; a subject table on which an inspection object is placed; and an X-ray detector are disposed side by side in the radiation axis direction, and that generates a reconstructed image of the inspection object on the basis of a moire image obtained by reading, at the X-ray detector, the X-ray radiated from the X-ray source and having passed through the plurality of grids and the inspection object placed on the subject table, wherein the inspection object is a three-dimensional laminated shaped product formed into a three-dimensional shape by laminating multiple layers of constituent material, and the X-ray Talbot imaging system generates the reconstructed image while the inspection object is placed on the subject table so that at least a direction in which the layers of the inspection object are laminated and a direction in which the plurality of slits of the plurality of grids are arranged are parallel to each other, X-ray imaging is performed a plurality of times while the inspection object is rotated about a radiation axis of the X-ray so that the orientation of the inspection object changes relative to the direction in which the slits are arranged, and an inner state of the inspection object is inspected on the basis of the reconstructed image.

2. The quality inspection method according to claim 1, wherein the X-ray source radiates an X-ray to which the inspection object is exposed at an average energy of 15 keV to 50 keV.

3. The quality inspection method according to claim 1, wherein the X-ray Talbot imaging system acquires, for each of a case in which the inspection object is placed on the subject table and a case in which the inspection object is not placed on the subject table, a plurality of moire images by repeating processing of moving at least one of the plurality of grids in a direction orthogonal to a radiation direction of the X-ray and reading an image signal by the X-ray detector in accordance with the X-ray radiated by the X-ray source each time the slits of the grid move by a constant periodic interval, produces a reconstructed image of the inspection object on the basis of the plurality of moire images with the inspection object and the plurality of moire images without the inspection object, and provides the reconstructed image of the inspection object with correction of an artifact attributable to an imaging condition difference between the case in which the moire images with the inspection object are captured and the case in which the moire images without the inspection object are captured.

4. The quality inspection method according to claim 1, wherein
the inspection object is formed of the constituent material that is composite resin containing fiber material.

5. The quality inspection method according to claim 1, wherein the inspection object is rotated about the radiation axis direction of the X-ray until the direction in which the layers of the inspection object are laminated and the direction in which the plurality of slits of the plurality of grids are arranged are orthogonal to each other.

* * * * *